(12) United States Patent  (10) Patent No.: US 7,533,051 B2
Powell et al.  (45) Date of Patent: May 12, 2009

(54) METHOD AND SYSTEM FOR IMPLEMENTING AUTOMATIC BID STATUS REFRESH AND ITEM ATTRIBUTE UPDATES IN AN ELECTRONIC EXCHANGE

(75) Inventors: Kim Powell, Niwot, CO (US); Liza Lyons, Purcellville, VA (US); Dave Stephens, Merced, CA (US); Kareem Benjamin, San Francisco, CA (US); Ben Gu, Foster City, CA (US); James Wang, Femont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1166 days.

(21) Appl. No.: 09/912,848

(22) Filed: Jul. 24, 2001

(65) Prior Publication Data

US 2009/0037314 A1  Feb. 5, 2009

Related U.S. Application Data

(60) Provisional application No. 60/266,946, filed on Feb. 6, 2001.

(51) Int. Cl.
 *G06Q 40/00* (2006.01)
(52) U.S. Cl. .............. 705/37; 9/26; 9/30; 713/156; 709/203
(58) Field of Classification Search ............ 705/30, 705/37, 26, 9; 713/156; 709/203
 See application file for complete search history.

(56) References Cited

U.S. PATENT DOCUMENTS

| | | | | |
|---|---|---|---|---|
| 5,860,067 A * | 1/1999 | Onda et al. | .................... | 705/9 |
| 6,018,343 A * | 1/2000 | Wang et al. | .................. | 715/733 |
| 6,058,379 A * | 5/2000 | Odom et al. | .................... | 705/37 |
| 6,449,601 B1 * | 9/2002 | Friedland et al. | ............... | 705/37 |
| 6,598,026 B1 * | 7/2003 | Ojha et al. | ...................... | 705/26 |
| 6,671,715 B1 * | 12/2003 | Langseth et al. | ............. | 709/203 |
| 6,871,214 B2 * | 3/2005 | Parsons et al. | ............... | 709/206 |
| 7,103,563 B1 * | 9/2006 | Voisin et al. | ................... | 705/14 |
| 2002/0046148 A1 * | 4/2002 | Alaia et al. | ..................... | 705/37 |

\* cited by examiner

*Primary Examiner*—Harish T. Dass
(74) *Attorney, Agent, or Firm*—Townsend and Townsend and Crew LLP

(57) ABSTRACT

An auction method for implementing automatic bid status refresh and item attribute updates in an electronic exchange. The method includes the step of receiving update configuration information from remote bidders via a distributed computer network. The update configuration information includes a time interval for receiving bid status updates. An auction is conducted wherein bid information received from the remote bidders is compared to determine a bid status and wherein the bid status is used to determine the bid status updates for the remote bidders. The bid status includes information regarding the most competitive, or winning, bid and any associated terms. The bid status updates are disseminated to the remote bidders via the distributed computer network in accordance with the update configuration information. At the conclusion of the auction, an auction winner is designated in accordance with the latest most competitive bid of the bid status. The time interval of the update configuration information is user selected and can be adjusted dynamically during the auction. Remote bidders receive bid status updates in accordance with their specified time interval. Changes to the items and/or item attributes of the auction are also disseminated to the remote bidders via the distributed computer network in accordance with the time interval of the update configuration information.

15 Claims, 5 Drawing Sheets

METHOD AND SYSTEM FOR IMPLEMENTING AUTOMATIC BID STATUS REFRESH AND ITEM ATTRIBUTE UPDATES IN AN ELECTRONIC EXCHANGE

This application claims the benefit of earlier filed U.S. Provisional Application Ser. No. 60/266,946 filed Feb. 6, 2001.

FIELD OF THE INVENTION

The field of the present invention pertains to efficient implementation and management of electronic commerce buying and selling operations on a distributed computer network. More particularly, the present invention relates to a method and system for the implementing of automatic bid status refresh and item attribute updates in electronic commerce buying and selling operations.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. As is generally known, it is advantageous to consider many alternative buyers/sellers when negotiating terms. A larger number of buyers and sellers available, for example, to bid on articles of manufacture, usually leads to a more efficient matching of requirements between buyers and sellers (e.g., getting the best deal). Traditional buying and selling mediums, such as auctions, catalog based purchasing and selling, and the like, do not always facilitate the most efficient matching of requirements. Alternatively, when prior inspection of an article is not possible or practical, the seller may provide the buyer with specifications describing the properties of the articles. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). However, many of the old problems still remain. For example, the fact that a buyer may find a seller from whom to purchase a batch of articles "on-line", does not change the fact that the buyer might not be aware of a more favorable purchase opportunity from a different seller prior to making the purchasing decision. Even when negotiation and/or inspection of all articles from all possible sellers is not practical, the buyer would find very helpful a comprehensive system for gathering offers from a large, widely distributed number of sellers.

To avoid these problems, a variety of electronic commerce facilitating schemes were developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges has proliferated, the implementation of electronic commerce auctions has become increasingly common. The use of electronic commerce facilitated auctions, or simply electronic auctions, has become a preferred method of efficiently matching buyers and sellers of goods and services. Electronic auctions provide a convenient means for aggregating large numbers of buyers or sellers and efficiently disseminating market information among them.

Auctions are different from traditional catalog based commerce schemes. Auctions generally aggregate buyers or sellers to purchase or sell items/services through the respective submission of competitive bids. Generally, the most competitive bid is designated the winner of the auction. For example, in an auction amongst multiple competing buyers, the most competitive bid is usually the bid offering the most money for the specified item or service. In an auction amongst multiple competing sellers, the most competitive bid is usually the bid offering the specified item or service for the lowest price.

Thus, buyers and sellers participating in an auction compete with one another on the basis of the terms of their bids. Auctioneers have an interest in making the bidding process as competitive as possible to effect the most efficient matching of requirements between sellers and buyers (e.g., getting the best deal). Large numbers of buyers or sellers competitively trying to outbid one another usually leads to the most favorable terms.

Buyers and sellers have an interest in ascertaining the competitiveness of their respective bids. In a highly competitive auction, the status of the bids for the specified item, as they are made, is important information regarding respective chances of a particular buyer or seller being designated the winner of the auction.

There is a problem, however, in that the use of electronic commerce facilitated auctions creates problems for the buyers and sellers with respect to tracking the status of the bidding process. Electronic commerce is generally enabled by wide area communications networks, namely, the Internet and the World Wide Web based network technologies. As such, for example, auction participants are typically coupled to the auction event (e.g., exchange, etc.) via a web browser client communicating with auction event servers over the Internet. As is common with Internet and World Wide Web based technologies, auction participants currently have to "hit reload" (e.g., within their web browser GUI) to determine the status of the auctions. For example, as new bids are entered, the only way an auction participant can determine the status her respective bid is to hit "refresh" in the browser GUI to query the exchange server for the status of all the bids. This is the only way a winning bidder can ensure he/she is still in possession of the winning bid. There is a certain amount of lag in the bid update process attributable to the Internet and World Wide Web network technologies.

Hence, the status of the bidding process is not efficiently disseminated to the auction participants. This leads to a large degree of uncertainty at the end of the auction as to which of the auction participants has won the auction. For example, several participants might believe they are in possession of the winning bid only to find that at some instant prior to the close of the auction they were outbid by a competitor. Additionally, more complex auctions can involve competition on many terms other than price. For example, attributes such as delivery conditions, special item features, volume discounts, and the like can factor into the determination of the most competitive bid. The effectiveness of the auction process is greatly hampered when such bid attributes are not efficiently disseminated to the participants.

Thus, what is required is a solution for efficiently providing bid status updates to all auction participants. The required solution should be user configurable to provide status updates in accordance with the circumstances of the auction and the particular requirements of the user. The required solution should provide status updates on special bid attributes such as delivery conditions, special item features, and the like. Additionally, the required solution should be compatible with widely used electronic commerce enabling technology. The present invention provides a novel solution to the above requirements.

SUMMARY OF THE INVENTION

The present invention provides a solution for efficiently providing bid status updates to all participants of an electronic auction. The present invention is user configurable to provide status updates in accordance with the circumstances of the auction and the particular requirements of the user. The present invention provides status updates on special bid attributes such as delivery conditions, special item features, and the like. Additionally, the system of the present invention is compatible with widely used electronic commerce enabling technology.

In one embodiment, the present invention is implemented as a software based auction method for implementing automatic bid status refresh and item attribute updates in an electronic exchange. The method includes the step of receiving update configuration information from remote bidders (e.g., users) via a distributed computer network. The update configuration information includes a time interval for receiving bid status updates. An auction is conducted wherein bid information received from the remote bidders is compared to determine a bid status and wherein the bid status is used to determine the bid status updates for the remote bidders. The bid status includes information regarding the most competitive, or winning, bid and any associated terms. The bid status updates are disseminated to the remote bidders via the distributed computer network in accordance with the update configuration information. At the conclusion of the auction, an auction winner is designated in accordance with the latest most competitive bid of the bid status. The time interval of the update configuration information is user selected and can be adjusted dynamically during the auction. Remote bidders receive bid status updates in accordance with their specified time interval. Changes to the items and/or item attributes of the auction are also disseminated to the remote bidders via the network in accordance with the time interval of the update configuration information.

In so doing, the present invention provides a solution for efficiently providing bid status updates to all participants of an electronic auction and is configurable to provide status updates in accordance with any specific circumstances of the auction and/or any particular requirements of the user. In addition to bid status updates regarding price terms of the bids, the status updates can also provide update information regarding special bid attributes such as delivery conditions, special item features, and the like.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
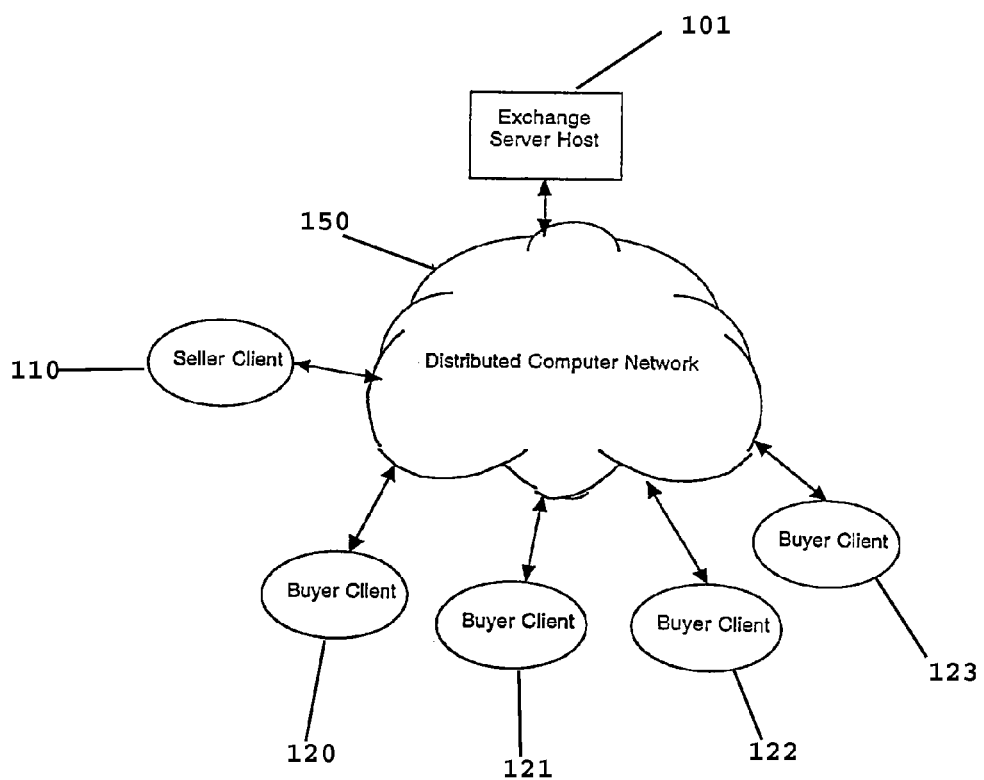
FIG. 1 shows a diagram of an electronic commerce auction operation in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a method and system for implementing automatic bid status refresh and item attribute updates in an electronic exchange. The present invention is user configurable to provide status updates in accordance with the circumstances of the auction and the particular requirements of the user. The present invention provides status updates on special bid attributes such as delivery conditions, special item features, and the like. Additionally, the system of the present invention is compatible with widely used electronic commerce enabling technology. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

Referring now to FIG. 1, a diagram of an electronic exchange auction system 100 in accordance with one embodiment of the present invention is shown. As depicted in FIG. 1, system 100 includes an exchange server host 101 communicatively coupled to a seller client 110 and a plurality of buyer clients 120-123 via a distributed computer network 150.

The exchange server host 101 functions as the central communications point for the auction operations, by conducting data collection and management of product information (e.g., items, services, or the like) provided by seller clients, such as seller client 110, and auction bid information provided by the buyer clients 120-123. Seller client 110 and buyer clients 120-123 communicate with exchange server host 101 via the communications protocols of distributed computer network 150, hereafter simply network 150. Exchange server host 101 conducts the auction operations on the basis of a comparison of the competing bid information from buyer clients 120-123.

A typical auction operation comprises buyer clients 120-123 accessing product information stored on exchange server host 101 by seller client 110 and submitting successive competing bids to exchange server host 101 for the product. The bids are transmitted from buyer clients 120-123 to exchange host server 101 via network 150. Similarly, the product information is provided to exchange server host 101 by seller client 110 via network 150.

The comparison of the competing bids submitted by buyer clients 120-123 is performed by exchange server host 101. Exchange server host 101 is configured to continuously receive and compare incoming bids and determine therefrom a bid status. The bid status includes information regarding the most competitive bid out of the bids received for the product, total number of bids received, any associated terms for the bids, and the like. The bid status can be updated with each incoming new bid.

Referring still to FIG. 1, exchange server host 101 is configured to communicate with buyer clients 120-123 to implement the automatic bid status refresh and item attribute updates of the present invention. Automatic bid status refresh provides updated bid status (e.g., information regarding the most competitive bid, total number of bids received, any associated bid terms, or the like) to each of the buyer clients 120-123. The updated bid status thus allows each of buyer clients 120-123 to track the status of the bidding process as the auction operation unfolds. For example, as new bids are entered and received by exchange server host 101, the updated bid status is sent to buyer clients 120-123, allowing the auction participants to track the status of their respective bids and ascertain the competitiveness of their most recent bids.

Thus, the status of the bidding process is efficiently disseminated to the auction participants at frequent intervals, thereby eliminating uncertainty during the auction as to which auction participant is winning, or at the conclusion of the auction, has won. For example, the frequent dissemination of the bid status prevents several participants erroneously believing they are in possession of the winning bid. With the frequent updates of the bid status, the participants are aware of the status of their respective bids, hence, at the close of the auction operation, the participants are aware of the most competitive bid and the auction winner.

Additionally, more complex auctions can involve competition on many terms other than price. For example, attributes such as delivery conditions, special item features, volume discounts, and the like can factor into the determination of the most competitive bid. These attributes are also included in the bid status updates sent to buyer clients 120-123.

It should be noted that a specification for items for the auction can be changed dynamically as the auction is conducted. Any such changes are disseminated to the remote bidders via the distributed computer network in accordance with the update configuration information. This aspect allows, for example, a seller to alter the items of the auction operation dynamically based upon the activity level or number of incoming bids being received. Where unsatisfactory interest is evidenced, the specification for the items can be altered to provoke additional bidding.

It should be noted that the embodiment of the present invention depicted in FIG. 1 (e.g., system 100) is implemented as a software based process cooperatively executing on the respective computer system platforms of both exchange server host 101 and buyer clients 120-123. The basic components of the computer system platforms are shown in the example computer system 512 of FIG. 5 below. To provide the product information and bid status updates simultaneously to a large umber of other systems and to accept the incoming bids, it is desirable to implement exchange server host 101 as a high speed, large capacity computer system platform such as, for example, a powerful multi-processor server or work station.

Referring still to FIG. 1, network 150 includes well know network technologies. For example, network 150 can be implemented using LAN technologies (e.g., Ethernet, Token-ring, etc.), the Internet, or other wired or wireless network technologies. The communications links between exchange server host 101, seller client 110, buyer clients 120-123 and network 150 can be implemented using, for example, a telephone circuit, communications cable, optical cable, wireless link, or the like.

Figure 2:
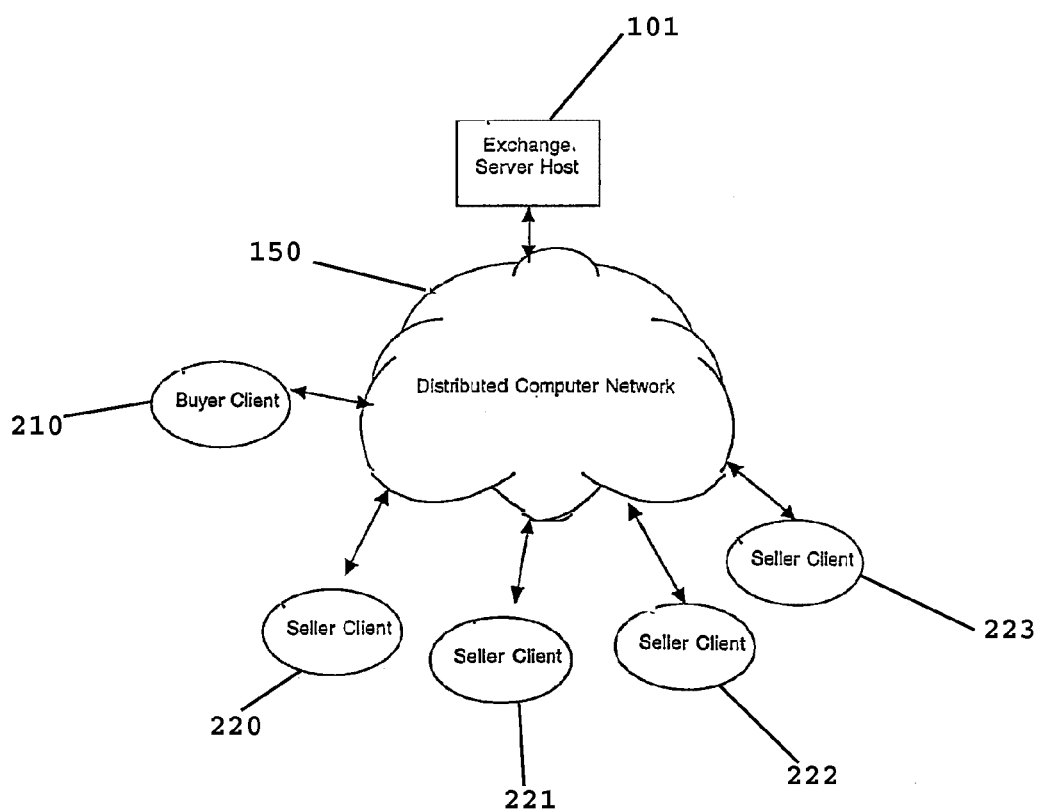
FIG. 2 shows a diagram of an electronic commerce auction operation in accordance with an alternative embodiment of the present invention.

FIG. 2 shows a system 200 in accordance with an alternative embodiment of the present invention. System 200 is substantially similar to system 100 of FIG. 1, however, system 200 depicts an auction operation wherein competing seller clients bid to sell products or services to a buyer client 210.

The auction operation depicted in FIG. 2 comprises seller clients 220-223 accessing product information stored on exchange server host 101 by buyer client 210 and submitting successive competing bids to exchange server host 101 in order to sell the specified product or service to buyer client 210. In a manner similar to system 100 of FIG. 1, the bids are transmitted from seller clients 220-223 to exchange host server 101 via network 150, and the product information is provided to exchange server host 101 by buyer client 210 via network 150. Auction operations in accordance with system 200 are at times referred to as "reverse auctions" where sellers submit competing bids to sell specified products and/or services to a buyer.

The comparison of the competing bids submitted by seller clients 220-223 is performed by exchange server host 101. Exchange server host 101 is adapted to continuously receive and compare incoming bids, determine therefrom a bid status, and disseminate this bid status to all auction participants. The bid status includes information regarding the most competitive bid out of the bids received for the product, total number of bids received, any associated terms for the bids, and the like, and can be updated with each incoming new bid.

As with system 100 of FIG. 1, the exchange server host 101 is configured to communicate with seller clients 220-223 to implement the automatic bid status refresh and item attribute updates of the present invention. Automatic bid status refresh provides updated bid status to each of the auction participants, allowing each of them to track the status of the bidding process, track the status of their respective bids, and ascertain the competitiveness of their most recent bids as the auction operation unfolds.

Figure 3:
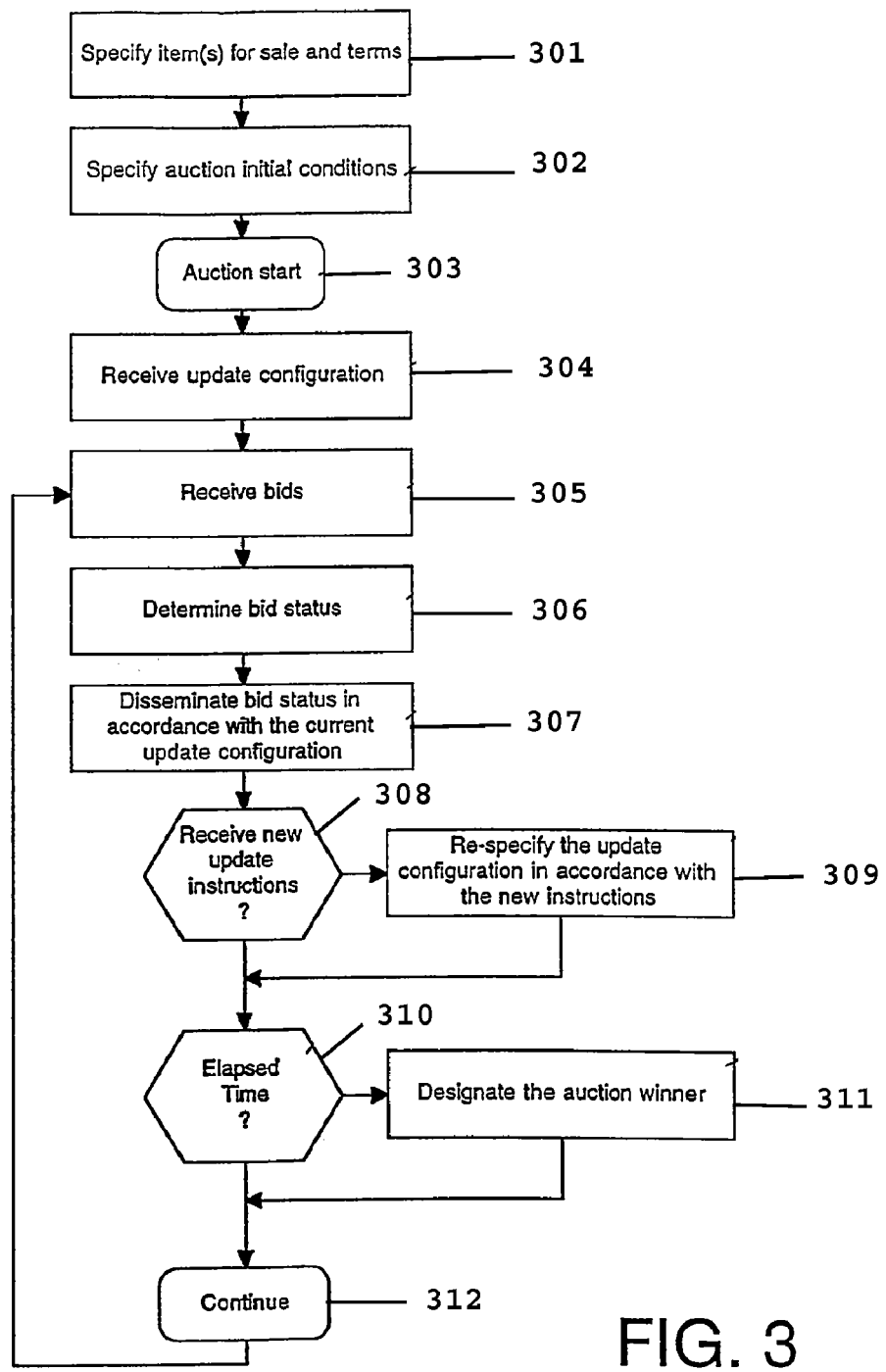
FIG. 3 shows a flowchart of the steps of a process in accordance with one embodiment of the present invention.

With reference now to FIG. 3, a flow chart of the steps of a process 300 in accordance with one embodiment of the present invention is shown. As depicted in FIG. 3, process 300 diagrams the operating process of an automatic bid status refresh and item attribute update process as performed by, for example, system 100 of FIG. 1, as a seller auctions an item to multiple competing buyers.

Process 300 begins in step 301, where a seller (e.g., seller client 110 of FIG. 1) specifies one or more items for sale and the terms of the sale. The terms of the sale can include, for example, delivery conditions, packaging conditions, and the like. The items for sale can be, for example, a single item (e.g., a diesel engine) or a batch or lot of items (e.g., 200 crates of automobile tires).

In step 302, initial conditions for the auction are specified. Such conditions can include, for example, the starting time of the auction, the duration of the auction, a reserve (if any), minimum/maximum bids, and the like. The initial auction conditions are used by the exchange server host (e.g., exchange server host 101) to set up the parameters of the auction operation. Subsequently, in step 303, the auction begins.

In step 304, the exchange server host receives the update configurations from the auction participants. As described above, the update configuration information is used by the exchange server host to disseminate bid status updates to each of the auction participants via the network. Each of the auction participants enters a desired update interval, using, for example, a graphical user interface of a browser program on a client machine. Bid status will automatically be received from the exchange server host at the interval specified, allowing the participants to monitor the status of the auction as it proceeds.

In step 306, the exchange server host receives bids from the auction participants as the auction operation proceeds. In step 306, as the bids are received, the exchange server host continuously determines a bid status. As described above, this bid status is used to track the status of the bids as they are received and determine the most competitive, or winning, bid. The bid status can be updated by the exchange server host with each new incoming bid such that at any given instant it accurately reflects the status of all submitted bids.

In step 307, the bid status is disseminated to each of the auction participants in accordance with their current update configuration. As described above, each of the auction participants entered a desired update interval. The exchange server host uses this interval to push bid status updates to the respective auction participants in accordance therewith. In the absence of the specified update interval, the exchange server host can push bid status updates in accordance with some default time interval.

In step 308, the exchange server host monitors the auction operation and monitors each of the auction participants for any new update configuration instructions. If new update configuration instructions are received, process 300 proceeds to step 309, where the exchange server host re-specifies the update configuration in accordance with the newly received instructions. Subsequent bid status updates are disseminated in accordance with the new update configuration (e.g., the new time interval), and process 300 proceeds to step 310. If no new instructions are received in step 308, process 300 proceeds directly to step 310.

In step 310, the exchange server host monitors the auction operation in the context of the parameters specified in the initial auction conditions (e.g., step 302). Hence, in step 310, if the time specified for the auction has elapsed, an auction winner is designated in step 311 in accordance with the current bid status maintained by the exchange server host. Otherwise, the auction operation continues, with the exchange server host accepting new bids from the auction participants, as shown by step 312.

Figure 4:
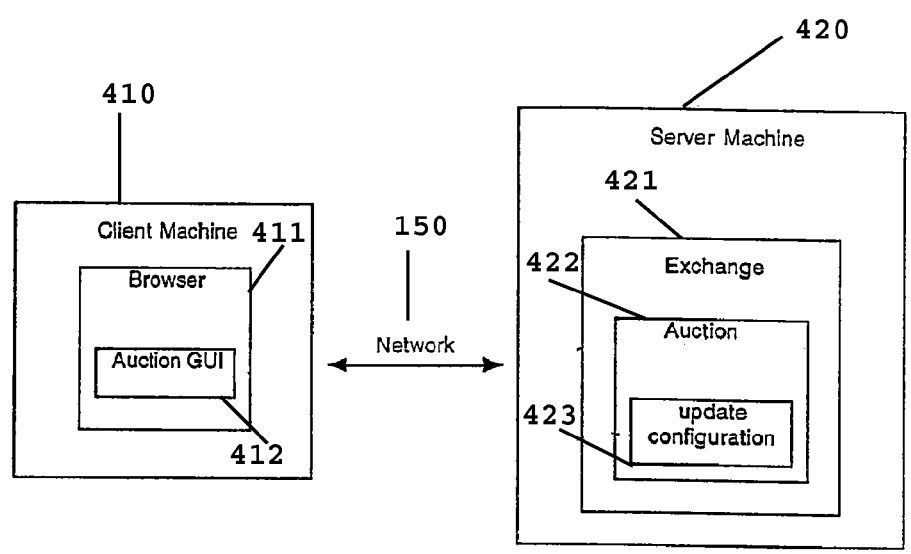
FIG. 4 shows a diagram of the software based components of a system in accordance with one embodiment of the present invention.

FIG. 4 shows a diagram of the relationship between the software components executing on a client computer system platform, client machine 410, and the software components executing on a server computer system platform, server machine 420, in accordance with one embodiment of the present invention.

As depicted in FIG. 4, client machine 410 executes a browser 411. As is well known, browser 411 functions as a client for browsing the World Wide Web, or compatible networks. Browser 411 is configured to receive information from servers on network 150, such as server 420, and to interpret and display the information graphically to a user. Browser 411 interprets HTML commands received from server 420 to display text and images within a graphical user interface (GUI). The GUI is customized to show components (e.g., text, images, buttons, fields, etc.) in accordance with the HTML information received from server 420. Using the HTML information, browser 411 implements an auction GUI to provide an intuitive means for input and output with a user.

Server 420 functions as the exchange server host for the auction operations. Server 420 instantiates an exchange 421 which functions as an E-commerce site on the network 150. Exchange 421 is implemented, for example, by using a database program running on server machine 420. Exchange 421 implements one or more auctions 422 to facilitate the buying and selling of goods and services. An auction in accordance with the present invention includes an update configuration component for auctions conducted wherein bid information received from the remote bidders is compared to determine a bid status, and wherein the bid status is used to determine the bid status updates for the remote bidders. As described above, the bid status includes information regarding the most competitive bid and any associated terms. The bid status updates are disseminated to the remote bidders via the distributed computer network in accordance with the update configuration information. At the conclusion of the auction, the bid status reveals the most competitive bid, and thus, the winner of the auction.

Thus, the present invention provides a method and system for implementing automatic bid status refresh and item attribute updates in an electronic exchange. The present invention is user configurable to provide status updates in accordance with the circumstances of the auction and the particular requirements of the user. The present invention provides status updates on special bid attributes such as delivery conditions, special item features, and the like. Additionally, the system of the present invention is compatible with widely used electronic commerce enabling technology.

Computer System Platform

Figure 5:
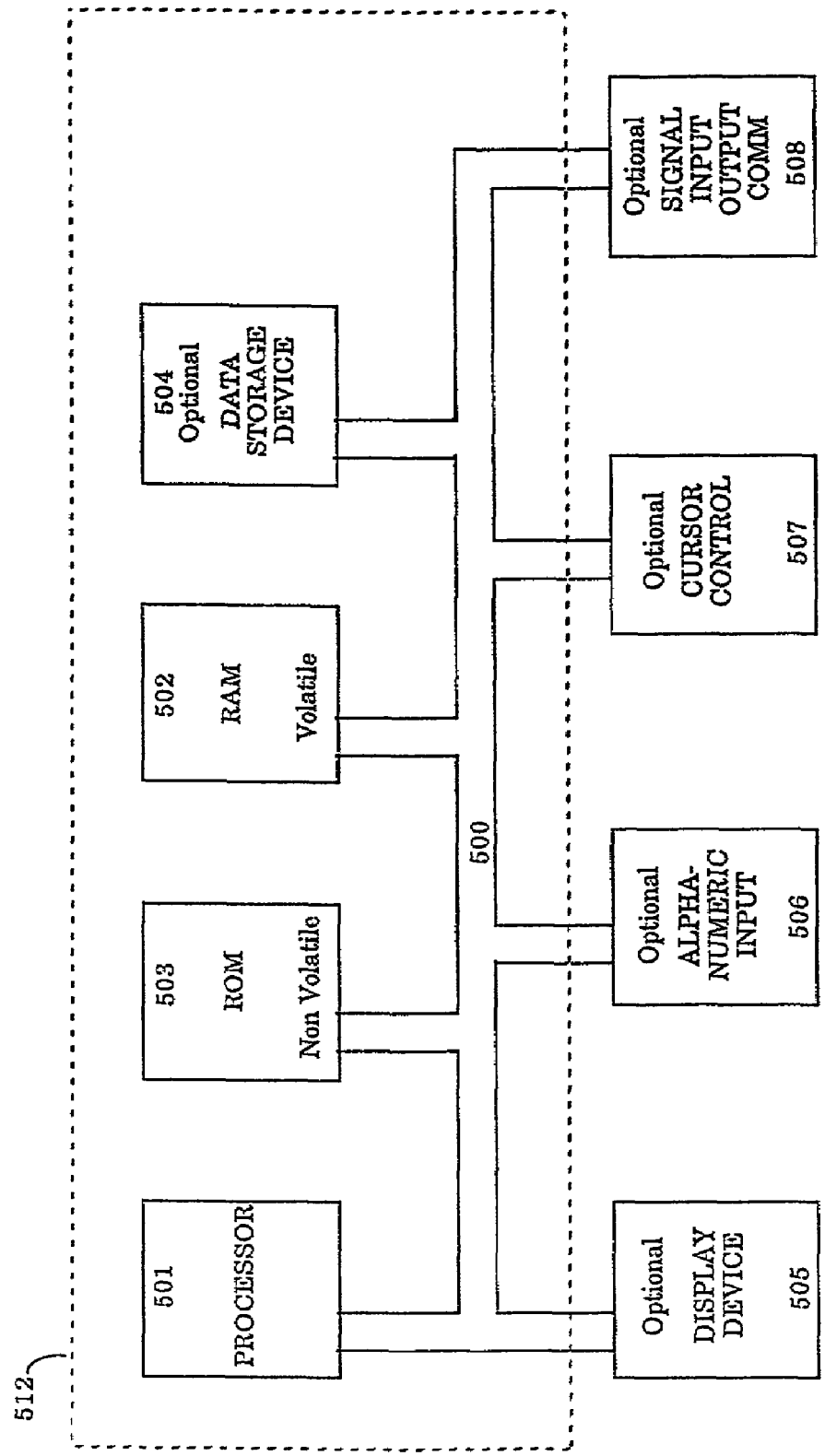
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented auction method, comprising the steps of:
   Receiving, by an exchange server, user selectable update configuration information from remote bidders via a distributed computer network, the update configuration information including a user selectable time interval for receiving bid status updates, wherein the time interval is selected through a graphical user interface of a browser, and wherein the exchange server includes a computer readable memory and a processor;
   adjusting the time interval for the update configuration information dynamically as the auction is conducted;
   conducting, by an exchange server, an auction wherein bid information received from the remote bidders is compared to determine a bid status and wherein the bid status is used to determine the bid status updates for the remote bidders;
   disseminating the bid status updates to the remote bidders via the distributed computer network in accordance with the update configuration information; and
   designating an auction winner at the conclusion of the auction in accordance with a most competitive bid of the bid status.

2. The method of claim 1 further including the step of:
   accessing a specification for an item for the auction, the specification for the item provided by the seller.

3. The method of claim 1 further including the step of:
   specifying initial conditions for the auction, the initial conditions including an allotted time for the auction.

4. The method of claim 1 wherein the time interval for the update configuration information allows the remote bidders to receive the bid status updates automatically in accordance with the time interval.

5. The method of claim 1 further including the steps of:
   changing a specification for the item for the auction dynamically as the auction is conducted; and
   disseminating the changed specification for the item to the remote bidders via the distributed computer network in accordance with the update configuration information.

6. The method of claim 1 further including step of:
   storing the update configuration received from the remote bidders at an exchange server host to enable the providing of the bid status to the remote bidders.

7. The method of claim 1 wherein the distributed computer network is the Internet.

8. A machine-readable storage medium storing a sequence of instructions, execution of which causes a processor to provide bid status updates to auction participants in an auction conducted via a distributed computer network, the execution of the sequence of instructions causes the processor to perform the actions of:
   accessing a specification for items for the auction;
   accessing initial conditions for the auction, the initial conditions including an allotted time for the auction;
   receiving user selectable update configuration information from remote bidders via a distributed computer network, the update configuration information including a user selectable time interval for transmitting bid status updates to the remote bidders, wherein the time interval is selected through a graphical user interface of a browser;
   adjusting the time interval for the update configuration information dynamically as the auction is conducted;

conducting an auction wherein bid information received from the remote bidders is compared to determine a bid status and wherein the bid status is used to determine the bid status updates for the remote bidders;

disseminating the bid status updates to the remote bidders via the distributed computer network in accordance with the update configuration information; and designating an auction winner at the conclusion of the auction in accordance with a most competitive bid of the bid status.

9. The machine-readable storage medium of claim 8 wherein the time interval for the update configuration information causes the server to transmit the status updates to the remote bidders automatically in accordance with the time interval.

10. The machine-readable storage medium of claim 8, wherein the execution of the sequence of instructions further causes the processor to perform the actions of:

changing a specification for an item for the auction dynamically as the auction is conducted; and disseminating the changed specification for the item to the remote bidders via the distributed computer network in accordance with the update configuration information.

11. The machine-readable storage medium of claim 8, wherein the execution of the sequence of instructions further causes the processor to perform the actions of:

storing the update configuration received from the remote bidders at an exchange server host to enable the providing of the bid status to the remote bidders.

12. The machine-readable storage medium of claim 8, wherein the distributed computer network is the Internet.

13. The machine-readable storage medium of claim 8, wherein the execution of the sequence of instructions further causes the processor to perform the actions of:

accessing a specification for an item for the auction, the specification for the item provided by the buyer.

14. A computer-implemented auction method, comprising the steps of:

receiving, by an exchange server, user selectable update configuration information from remote bidders via a distributed computer network, the update configuration information including a user selectable time interval for receiving bid status updates, and wherein the exchange server includes a computer readable memory and a processor;

conducting, by an exchange server, an auction wherein bid information received from the remote bidders is compared to determine a bid status and wherein the bid status is used to determine the bid status updates for the remote bidders, wherein the time interval is selected through a graphical user interface of a browser;

disseminating the bid status updates to the remote bidders via the distributed computer network in accordance with the update configuration information;

adjusting the time interval for the update configuration information dynamically as the auction is conducted and in accordance with a new user selection;

changing a specification for the item for the auction dynamically as the auction is conducted;

disseminating the changed specification for the item to the remote bidders via the distributed computer network in accordance with the update configuration information; and designating an auction winner at the conclusion of the auction in accordance with a most competitive bid of the bid status.

15. The method of claim 14 further including step of:

storing the update configuration received from the remote bidders at an exchange server host to enable the providing of the bid status to the remote bidders.

* * * * *

UNITED STATES PATENT AND TRADEMARK OFFICE
CERTIFICATE OF CORRECTION

| | | |
|---|---|---|
| PATENT NO. | : 7,533,051 B2 | Page 1 of 1 |
| APPLICATION NO. | : 09/912848 | |
| DATED | : May 12, 2009 | |
| INVENTOR(S) | : Kim Powell et al. | |

It is certified that error appears in the above-identified patent and that said Letters Patent is hereby corrected as shown below:

In column 10, line 7, in claim 1, delete "Receiving," and insert -- receiving --, therefor.

Signed and Sealed this

First Day of June, 2010

David J. Kappos
*Director of the United States Patent and Trademark Office*